Figure 1:
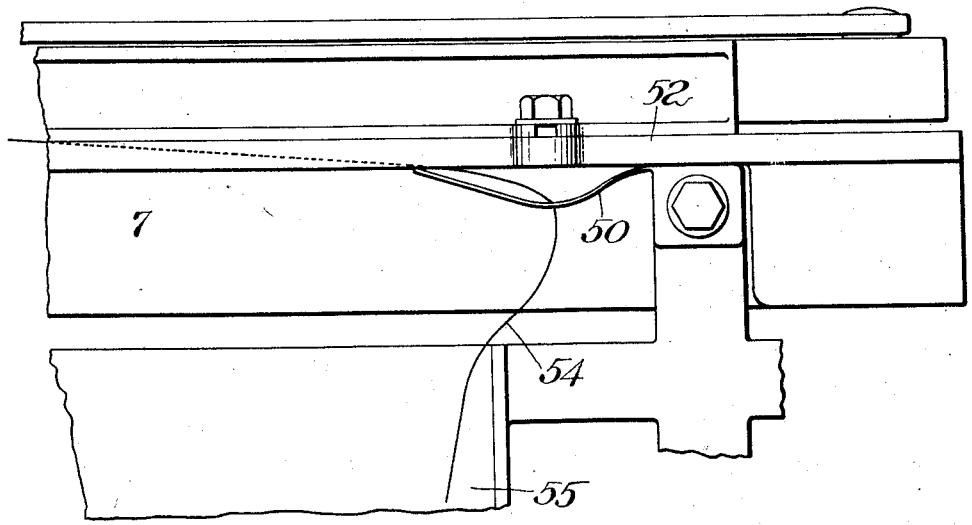

C. H. DRAPER AND J. NORTHROP.
FEELER LOOM.
APPLICATION FILED MAY 1, 1916.

1,361,973.

Patented Dec. 14, 1920.
4 SHEETS—SHEET 1.

Inventors:
Clare H. Draper
Jonas Northrop
by their attorneys
Phillipo VanEuen Fish C. H. DRAPER AND J. NORTHROP.
FEELER LOOM.
APPLICATION FILED MAY 1, 1916.
1,361,973.
Patented Dec. 14, 1920.
4 SHEETS—SHEET 2.
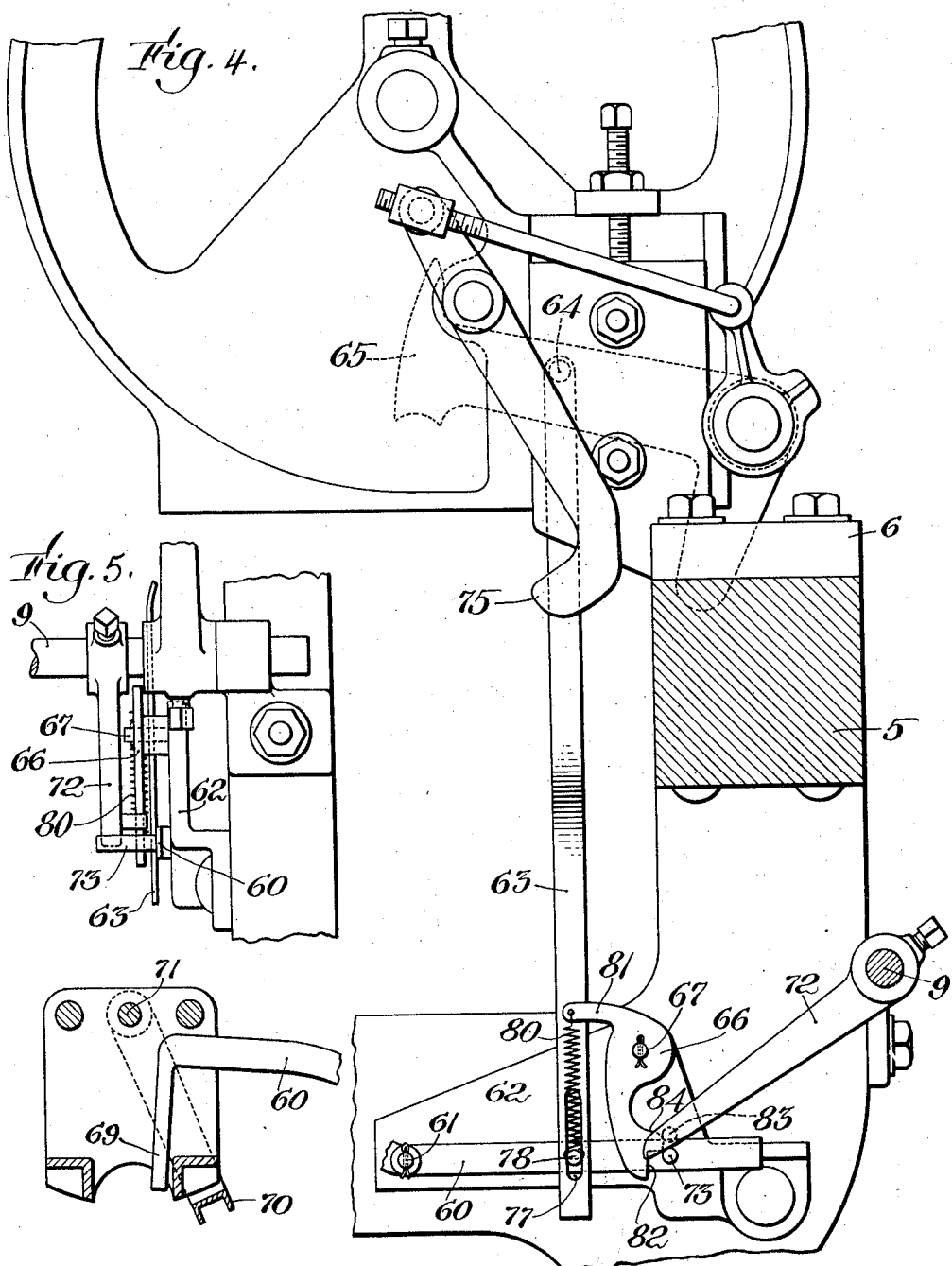

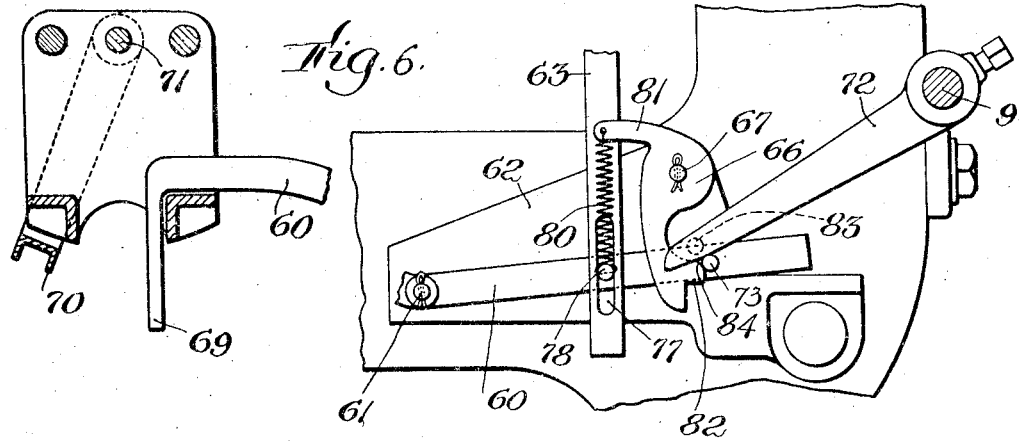
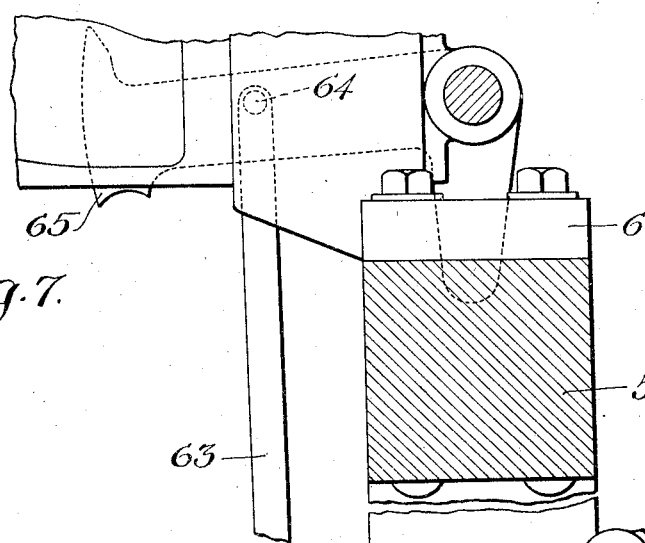
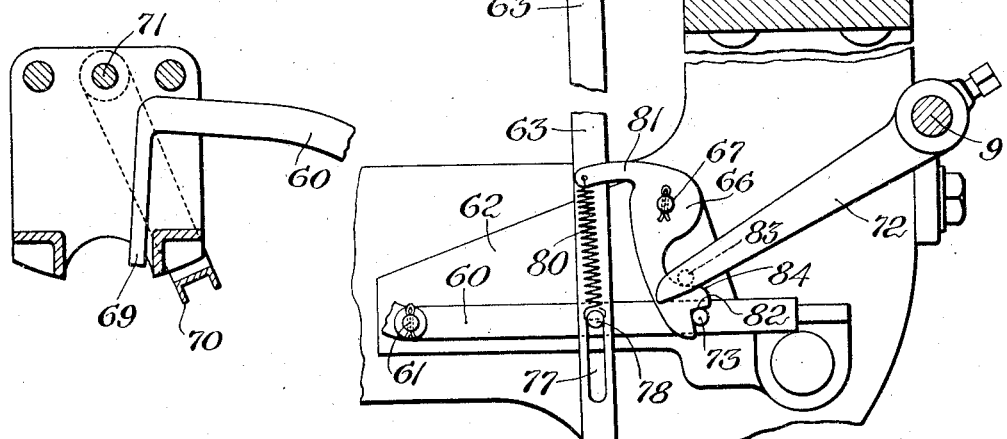

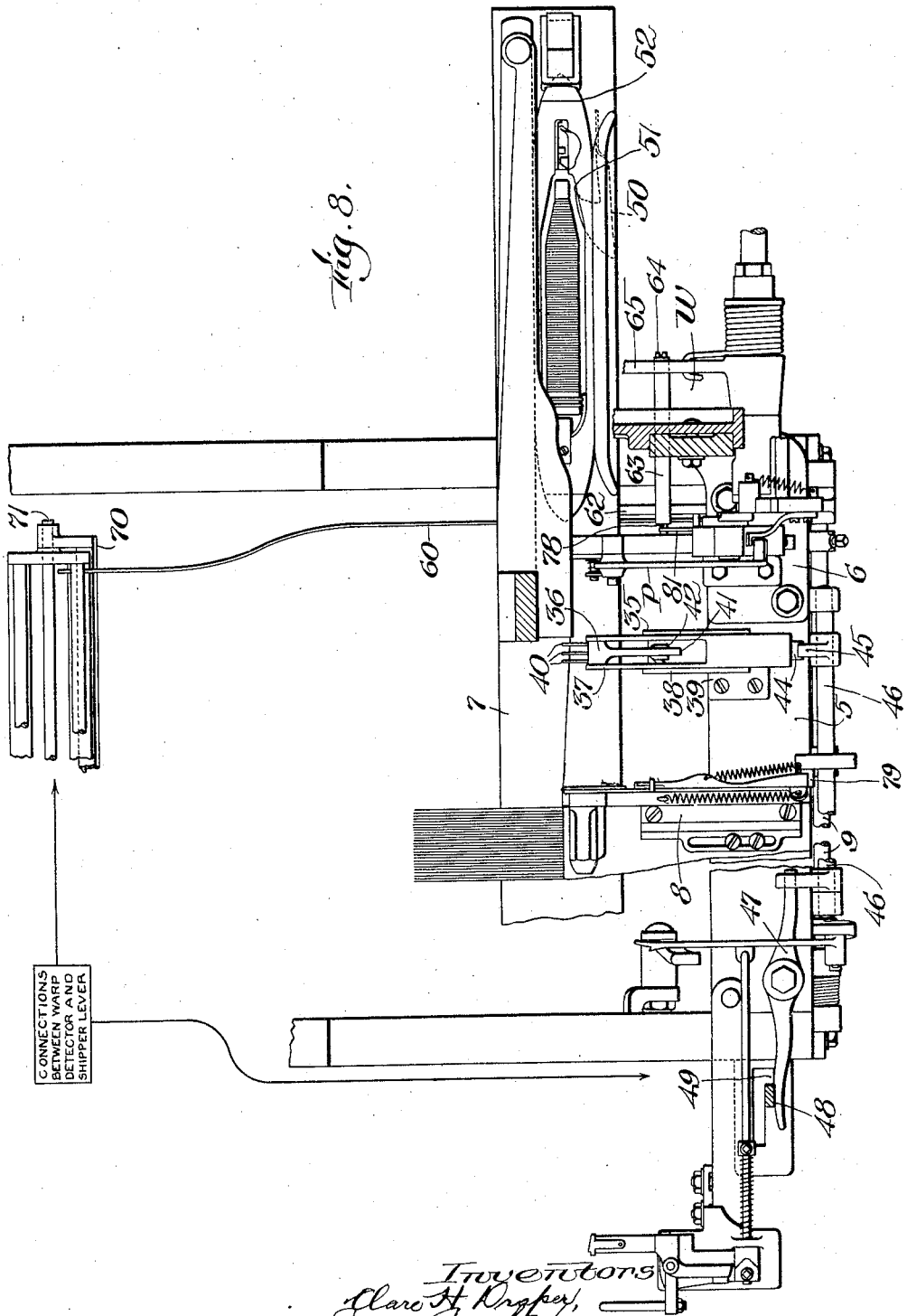

UNITED STATES PATENT OFFICE.

CLARE H. DRAPER AND JONAS NORTHROP, OF HOPEDALE, MASSACHUSETTS, ASSIGNORS TO HOPEDALE MANUFACTURING COMPANY, OF MILFORD, MASSACHUSETTS, A CORPORATION OF MASSACHUSETTS.

FEELER-LOOM.

1,361,973.  Specification of Letters Patent.  Patented Dec. 14, 1920.

Application filed May 1, 1916. Serial No. 94,667.

*To all whom it may concern:*

Be it known that we, CLARE H. DRAPER and JONAS NORTHROP, citizens of the United States, residing at Hopedale, in the county of Worcester and Commonwealth of Massachusetts, have invented certain new and useful Improvements in Feeler-Looms; and we do hereby declare the following to be a full, clear, and exact description of the invention, such as will enable others skilled in the art to which it appertains to make and use the same.

The present invention relates to an improvement in feeler looms and more particularly to an improvement in mechanism for preventing the occurrence of mispicks and double picks.

Weft replenishing looms employed in the production of high grade fabrics are commonly provided with filling feeler mechanism for the purpose of preventing the weft or filling in the active shuttle from becoming entirely exhausted, so as thereby to eliminate the weaving of short wefts or filling threads into the cloth. Such looms are known as feeler looms. It sometimes happens during the operation of even a feeler loom that short wefts occur, thereby causing a blemish in the cloth. When only a short weft or filling is laid in one shed, a condition obtains which is known in the art as a "mispick;" and when a short weft or filling is laid in the same shed with a complete weft, a condition obtains which is known in the art as a "double pick". The object of the present invention is to produce a mechanism which will operate, either to prevent the occurrence of mispicks and double picks, or to stop the loom when it is impossible to prevent their occurrence.

One cause of the occurrence of mispicks during the operation of a feeler loom is the occasional faulty operation of the filling feeler mechanism, whereby the weft or filling on the bobbin in the active shuttle is unwound beyond a predetermined extent, that is, beyond critical exhaustion. In this case, if the filling becomes entirely exhausted during the pick of the shuttle to the replenishing side of the loom, the failure of filling is not detected by the filling detector of feeler looms provided with only one filling detector, because as these looms have hitherto been constructed the filling detector has been situated on the filling feeler side of the loom. Consequently, the loom will not be stopped, the shuttle will be replenished, and the cloth will be woven with a mispick in it. A feature of the present invention is directed to the elimination of filling feeler-caused mispicks in single detector feeler looms, by positioning the filling detector on the weft replenishing side of the loom, which is the side remote from the filling feeler mechanism, so that, if the filling becomes entirely exhausted on the pick preceding replenishment, filling absence will be detected on the replenishing beat-up of the lay, and the loom will be stopped. Now, inasmuch as the function of the filling detector of a feeler loom is simply to cause loom stoppage in case of filling absence, if the filling end left by the outgoing bobbin (this filling end being known as the outgoing filling end) and the filling end left by the newly inserted bobbin remain uncut in front of the detector or weft fork, the latter will fail to detect absence of the active filling if, after replenishment, the newly inserted filling should break before the outgoing and incoming filling ends are severed. Accordingly, (although not restricted thereto) this feature of the invention is particularly adapted for use in a loom provided with a temple cutter operating positively to cut these filling ends, at least as soon after replenishment as the second return beat of the lay after the replenishing operation.

Mispicks are sometimes caused when, on the replenishing beat-up of the lay after critical exhaustion of filling has been indicated by the filling feeler mechanism, the shuttle is improperly boxed, or if for some other reason, the weft replenishing mechanism is prevented from operating. As feeler looms are usually constructed, the non-operation of the weft replenishing mechanism is intended to prevent the operation of the feeler thread parter which severs the filling thread relatively near the shuttle. It often happens, however, that the non-operation of the weft replenishing mechanism does not prevent the operation of the feeler thread parter. Consequently, when the shuttle has been boxed on the weft replenishing side of the loom after critical exhaustion of filling has been indicated by the filling feeler mechanism, the feeler parter is brought into operation. This operation of the feeler thread parter when the weft replenishing mechanism does not operate results in mispicks, as will be hereinafter explained. Another feature of the present invention is to prevent the occurrence of mispicks when, because of an improperly boxed shuttle or for some other reason, the weft replenishing mechanism does not operate. This feature of the invention comprises mechanism for causing loom stoppage whenever the filling feeler mechanism calls for replenishment and the replenishing mechanism does not operate on the next or replenishing beat-up of the lay.

These various features of the invention for preventing the occurrence of mispicks and double picks during the operation of a feeler loom are described in the following specification and particularly pointed out in the appended claims.

Figure 2:
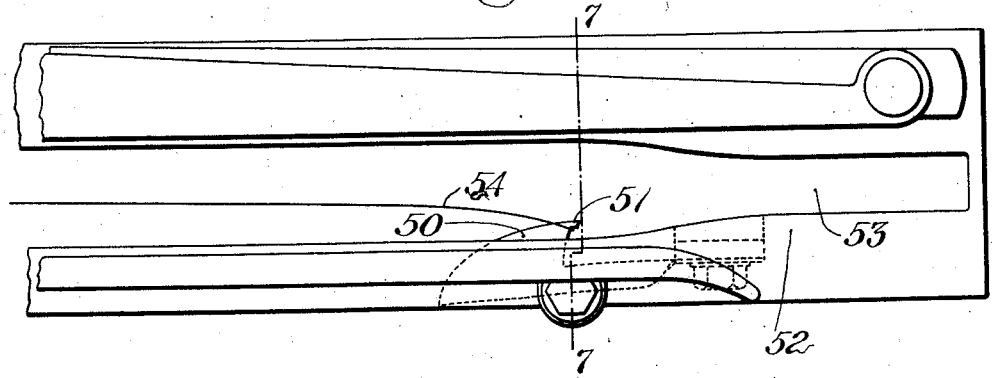
Figure 3:
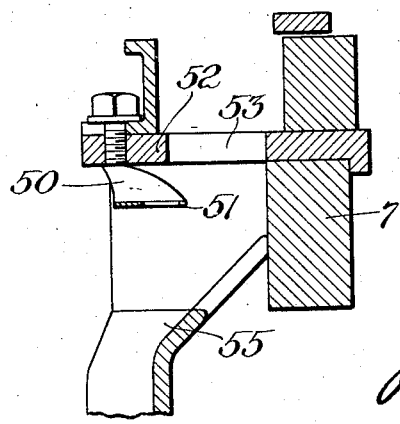

In the accompanying drawings illustrating the preferred form of the invention Figures 1 and 2 are a front elevation and a plan respectively, of the shuttle box at the weft replenishing side of the loom showing the filling hook; Fig. 3 is a section taken on the line 7—7 of Fig. 2; Fig. 4 is an elevation, partly in section, of the replenishing side of the loom, showing the mechanism for causing loom stoppage when the weft replenishing mechanism is prevented from operating after indication of critical exhaustion of filling by the filling feeler mechanism; Fig. 5 is a front elevation of a part of the structure shown in Fig. 4; Fig. 6 illustrates the operation of the stop mechanism when the weft replenishing mechanism is prevented from operating; Fig. 7 illustrates the operation of the stop mechanism when weft replenishment takes place; and Fig. 8 is a plan of such portions of a feeler loom as are necessary to illustrate the application thereto of the various features of the present invention.

The feeler loom to which the features of the present invention are applied may be of any usual or preferred form. The loom illustrated in the drawings comprises a breast beam 5 on the right-hand end of which is secured a bracket 6 which supports the hopper and other parts of the weft replenishing mechanism "W." The lay 7 is mounted for oscillatory movements toward and from the breast beam. Mounted on the breast beam is the usual temple indicated at 8. Fulcrumed in suitable journals secured to the front side of the loom and extending transversely thereof, is the change or rock shaft 9 connected at one end with the weft replenishing mechanism "W." When the filling feeler mechanism indicates predetermined or critical exhaustion of filling on the bobbin in the active shuttle, the rock shaft 9 is adapted to be oscillated to set in operation the weft replenishing mechanism. The construction of the parts above enumerated and their mode of operation, together with other parts of the loom necessary to a disclosure of the present invention, are well-known to those skilled in the art.

The feature of the present invention which prevents the occurrence of mispicks in the woven cloth due to faulty operation of the filling feeler mechanism, consists in positioning the filling detector on the side of the loom remote from the filling feeler mechanism, that is, on the same side of the loom with the weft replenishing mechanism. In accordance with this feature of the invention the filling detector, generally indicated by the reference character 35, is mounted on the breast beam 5 and is situated between the temple thread cutter and the feeler thread parting and clamping mechanism "P" as shown in Fig. 8. The filling detector may be of any usual or preferred construction, that shown in the drawings consisting of a filling fork 36 pivotally mounted on a slide 37 adapted to move forwardly and rearwardly in the guide 38 secured to the bracket 39 fastened on the breast beam 5. When there is filling present in front of the tines 40 of the filling fork 36, the fork is tilted so that its tail 41 is raised out of the path of motion of the weft hammer 42. But, when filling is absent, the tail 41 of the fork is depressed and the weft hammer on its forward movement engages the tail 41, thereby moving it and the slide 37 forwardly so that the boss 44 on the forward end of the slide 37 engages an arm 45 secured to and extending upwardly from a transverse shaft 46 suitably mounted in bearings on the front side of the breast beam, thereby oscillating the arm 45 and the shaft 46. This transverse shaft 46 is connected at the other end of the loom with one arm of a shipper or knock-off lever 47 pivotally mounted on the breast beam. The other arm of the shipper knock-off lever bears against the shipper 48, which is received in a notch 49 in the shipper slot when the loom is running. When the shaft 46 is oscillated through the arm 45 by the forward movement of the slide 37, it operates to actuate the shipper lever, which disengages the shipper from its holding notch, thereby stopping the loom.

Inasmuch as this filling detector is situated between the selvage of the cloth and the weft replenishing mechanism, it is obvious that, unless that part of the outgoing filling end which extends from the selvage to the thread parting and clamping mechanism "P" is removed from in front of the filling detector, and also unless the incoming filling end is removed, the detector will be unable to detect the absence or presence of active filling in the shed. Accordingly, it is necessary that this feature of the invention be used in connection with a temple thread cutter which operates to cut the filling ends left by both the outgoing and the incoming bobbins at least as soon after replenishment as the second return or backward beat of the lay.

The occurrence of double picks by reason of the outgoing filling end being drawn into the shed by the shuttle on the first pick after replenishment, is eliminated in the present instance by means of a device applied to the shuttle box under the weft replenishing mechanism. The device consists of a plate-like hook 50 secured to the under side of the front of the shuttle box, as shown in Figs. 1 and 2. The thread hook 50 is furnished with a barb 51 which projects inwardly under the shuttle race 52 toward the slot 53, in which the picker-stick oscillates, and stops short of the picker-stick path. When the shuttle comes to rest in the shuttle box, the eye of the shuttle is somewhat to the right of the barb 51, so that, when the critically exhausted bobbin is ejected from the shuttle through the aperture 53 in the shuttle race, during weft replenishment, the filling end 54 extending from outside the shuttle, through the shuttle eye to the ejected bobbin, is engaged by the barb 51. If the filling end lies in the groove in the front wall of the shuttle, as the ejected bobbin falls from the shuttle down by the plate 55 the bobbin will draw it through the shuttle eye and, consequently, there will be no liability of this filling end being drawn into the shed on the pick of the shuttle toward the other side of the loom. But, if it happens that the outgoing filling end 54 is caught between the front wall of the shuttle and the front side or binder of the shuttle box, the falling bobbin will not draw the filling end after it through the shuttle eye and, consequently, this filling end will be in position to be drawn into the shed by the shuttle on the first pick after replenishment, and thereby cause a double pick. By means of the thread hook 50, however, the filling end 54 is prevented from being drawn into the shed by the shuttle when it is picked to the other side of the loom after the replenishing operation, because, as the shuttle is shot away from the replenishing mechanism, the hook 50 engages and prevents the filling end from being drawn along with the shuttle. It will be apparent from an inspection of Fig. 1 that if the hook 50 did not catch and retain the filling end 54, it would be drawn to the left toward the inner end of the shuttle box by the shuttle, in case the filling end were caught between the shuttle and the shuttle box. This thread hook does not form any feature of the present invention, but is illustrated and described herein for the purpose of presenting a complete description of the loom in which the invention is preferably embodied.

Whenever, during the operation of a weft replenishing loom, the change or rock shaft is actuated to position the parts of the weft replenishing mechanism preparatory to the insertion of a fresh supply of filling in the active shuttle, the feeler thread parter, as usually constructed, is brought into operation to sever and clamp the outgoing filling end on the replenishing beat-up of the lay. If now the weft replenishing operation does not take place and the feeler thread parter has operated to sever the filling, the shuttle with the severed or trailing filling end will be picked to the filling feeler side of the loom and this trailing filling end will extend into the shed a distance of a few inches and be woven into the cloth, thereby causing a mispick. This condition of affairs sometimes occurs during the operation of a feeler loom because, after the filling feeler mechanism has indicated critical or predetermined exhaustion of filling, it sometimes happens that the shuttle is improperly boxed at the replenishing side of the loom immediately before weft replenishment, and in such cases the usual shuttle feeler prevents operation of the weft replenishing mechanism. Thereupon, if the feeler thread parter has operated, the shuttle with its severed filling end is picked to the filling feeler side of the loom, causing a mispick, and is again returned to the weft replenishing side. If at this time the shuttle is again improperly boxed, the shuttle feeler will again prevent an operation of the weft replenishing mechanism. This prevention of the operation of the weft replenishing mechanism, without preventing the operation of the thread parter, and the mispicks resulting therefrom, may continue indefinitely if the filling on the bobbin during this course of events is sufficient to lay wefts in the shed until the operation of the weft replenishing mechanism. Moreover, it sometimes happens when the shuttle is improperly boxed on the replenishing beat-up of the lay that the filling is struck by the shuttle feeler against the metal tip of the shuttle and thereby severed. This severing of the filling between the shuttle feeler and an improperly boxed shuttle results in a mispick for the same reason that mispicks occur when the feeler thread parter operates on the non-operation of the replenishing mechanism. It is obvious that, under these conditions of operation, the loom should be stopped. And accordingly the occurrence of mispicks from this cause is eliminated in the present invention by means of a stop mechanism which operates to stop the loom whenever, after the change shaft has been actuated either because of critical exhaustion of filling, or because of absence of filling, and the parts of the weft replenishing mechanism are positioned for the insertion of a fresh supply of filling in the active shuttle, an improperly boxed shuttle at the weft replenishing side of the loom, or some other cause, results in the non-operation of the weft replenishing mechanism. The mechanism for causing loom stoppage under these conditions comprises a feeler lever 60 pivoted at 61 to a bracket 62 secured to the frame of the loom, a resetting link 63 pivoted at 64 to the transferrer 65, and a cam lever 66 pivoted at 67 on the bracket 62. The feeler lever 60 extends forwardly and rearwardly, and at its rearward end it is furnished with a down-turned finger 69 which is adapted at times to be lowered into the path of motion of the drop wire feeler 70 pivoted at 71 for oscillatory movements. The feeler 70 forms part of the usual warp stop motion. The fulcrum 61 of the feeler lever 60 is so positioned that the finger 69 tends constantly to descend into the path of motion of the drop wire feeler 70. During the normal operation of the loom the finger 69 is held in raised position, out of the path of motion of the feeler 70, by the engagement of an arm 72 fast on the rock shaft 9 with a pin 73 secured to the forward end of the lever 60. When the filling feeler mechanism has operated to indicate critical exhaustion of filling in the active shuttle and the change or rock shaft 9 is turned clockwise, viewing Fig. 4, the arm 72 is raised, thereby permitting the finger 69 to descend into the path of motion of the drop wire feeler 70, as shown in Fig. 6. When the rock shaft 9 was turned and permitted the finger 69 to descend, the drop wire feeler was on its rearward movement. The beat-up of the lay, which follows the pick of the shuttle to the replenishing side of the loom, causes an actuation of the transferrer 65 to insert a new bobbin into the shuttle if the shuttle is properly boxed under the replenishing mechanism; but if on this beat-up of the lay the shuttle is improperly boxed, that is, has not entered the shuttle box far enough, the shuttle will contact with the shuttle feeler 75 which, at this time, is in its rearward position. Thereupon, the continued forward movement of the lay and the shuttle will force the shuttle feeler 75 forwardly and prevent the downward or transferring movement of the transferrer 65 in the usual manner. During this beat-up of the lay, the drop wire feeler 70 is on its forward swing, and inasmuch as the finger 69 of the feeler lever 60 has been permitted to remain in the path of motion of the feeler 70, the finger 69 acts as a fallen drop wire to stop the forward swing of the feeler 70, and, as a result, the warp stop motion is brought into operation to stop the loom.

When the shuttle is properly boxed on the beat-up of the lay after the indication of critical exhaustion of filling by the filling feeler, and the transferrer is permitted to descend to insert a new bobbin into the shuttle, the downward movement of the transferrer causes the resetting link 63 to descend until the upper end of a slot 77 formed in the lower end thereof comes into engagement with a pin 78 projecting laterally from the forward end of the feeler lever 60. The continued downward movement of the resetting link 63 oscillates the feeler lever 60 on its pivot 61, depressing its forward end and raising the rearward end until the finger 69 is clear of the path of motion of the drop wire feeler 70. During the momentary dwell of the transferrer 65 at the limit of its downward stroke, the arm 72 remains in raised position and continues in this raised position until after the transferrer rises on the backward beat of the lay after replenishment. It is necessary, therefore, to prevent the finger 69 from descending into the path of motion of the feeler 70 while the arm 72 remains raised and the upper end of the slot 77 is disengaged from the pin 78 by the upward movement of the resetting link 63 and the transferrer 65. Accordingly, the cam lever 66 is provided with a spring 80, one end of which is attached to an arm 81 of the lever 66, the other end being secured to the pin 78, so that, when the resetting lever 63 forces the forward end of the lever 60 downward, the spring 80 acts to rotate the cam lever 66 on its fulcrum 67 until the recess or shoulder 82 formed in the lower end of the lever 66 is brought into engagement with the pin 73, thereby holding down the forward end of the lever 60 when the resetting link 63 rises. On the backward beat of the lay after replenishment, the rock shaft 9 together with its arm 72 is oscillated into normal position. As the outer end of the arm 72 descends, a pin 83 projecting laterally therefrom presses against a cam surface 84 formed on the cam lever 66, thereby imparting a clockwise movement to the lever 66 and forcing the shoulder 82 out of engagement with the pin 73. At the end of its downward movement, the under side of the arm 72 again comes into engagement with the pin 73, and so the forward end of the lever 60 is held depressed and the rear end thereof is maintained in raised position with the finger 69 out of the path of motion of the feeler 70.

The stop mechanism thus described forms a simple and efficient means for causing loom stoppage whenever, after the filling feeler mechanism has indicated predetermined exhaustion of filling on the bobbin in the active shuttle, the weft replenishing mechanism is prevented from operating.

Having thus described the invention, what is claimed is:—

1. A feeler loom having, in combination, a lay, a breast beam, a shipper, a filling feeler mechanism, a weft replenishing mechanism, a warp stop motion, connections between the warp stop motion and the shipper, and a stop mechanism operatively connected with the weft replenishing mechanism and the warp stop motion constructed and arranged to cause the warp stop motion to actuate the shipper to stop the loom when, after the indication of critical exhaustion of filling by the feeler mechanism, the weft replenishing mechanism on the next forward beat of the lay is prevented from performing the weft replenishing operation.

2. A feeler loom having, in combination, a weft replenishing mechanism, a filling feeler mechanism, a warp stop motion, and a stop mechanism having connections between the warp stop motion and the weft replenishing mechanism constructed and arranged to stop the loom whenever, upon indication of predetermined exhaustion of filling by the feeler mechanism, the weft replenishing mechanism does not operate.

3. A feeler loom having, in combination, a weft replenishing mechanism, a filling feeler mechanism, a warp stop motion, a rock shaft, and a stop mechanism comprising a lever connected with the warp stop motion and means connecting the lever with the weft replenishing mechanism, the parts of the stop mechanism being constructed and arranged to cause loom stoppage through the warp stop motion whenever, upon an actuation of the rock shaft, the weft replenishing mechanism is prevented from completing the weft replenishing operation.

4. A loom having, in combination, a weft replenishing mechanism, and a stop mechanism connected with the weft replenishing mechanism and having provision for causing loom stoppage whenever the weft replenishing mechanism is started in operation for weft replenishment and is prevented from completing the replenishing operation.

5. A feeler loom having, in combination, a weft replenishing mechanism, a filling feeler mechanism, and a stop mechanism constructed and arranged to cause loom stoppage whenever, after predetermined exhaustion of filling has been indicated by the feeler mechanism, the weft replenishing mechanism is prevented from inserting a fresh supply of filling in the shuttle.

6. A loom having, in combination, a weft replenishing mechanism, a rock shaft, and a stop mechanism having provision for causing loom stoppage whenever the weft replenishing mechanism is started in operation and is prevented from inserting a fresh supply of filling in the shuttle, comprising a lever and means for controlling the operation of the lever adapted to permit the lever to remain in inoperative position during normal operation of the loom, to be brought into operative position upon an actuation of the rock shaft, and to be restored to normal position if, after the actuation of the rock shaft, the weft replenishing operation is completed.

7. A weft replenishing loom having, in combination, a weft replenishing mechanism including a transferrer and a rock shaft, means for stopping the loom, and a stop mechanism connected with the loom stopping means comprising, a lever, connections between the rock shaft and the lever to keep the lever in inoperative position during normal operation of the loom and to permit the lever to assume an operative position upon an actuation of the rock shaft, and connections between the lever and the transferrer adapted to restore the lever to inoperative position upon a downward movement of the transferrer and to permit the lever to remain in operative position if the transferrer is prevented from making a downward movement after an actuation of the rock shaft.

8. A weft replenishing loom having, in combination, a weft replenishing mechanism including a transferrer and a rock shaft, means for stopping the loom, and a stop mechanism connected with the loom stopping means comprising, a lever, connections between the rock shaft and the lever adapted to maintain the lever in inoperative position during normal operation of the loom, connections between the lever and the transferrer having provision for restoring the lever to inoperative position upon a downward movement of the transferrer, and means for maintaining the lever in inoperative position until the return movement of the rock shaft after an actuation thereof.

9. A loom having, in combination, a weft replenishing mechanism, a shuttle, a shuttle feeler, and a stop mechanism connected with the weft replenishing mechanism and having provision for causing loom stoppage whenever the weft replenishing mechanism is started in operation for weft replenishment and is prevented from completion by the striking of the shuttle feeler against the shuttle.

10. A loom having, in combination, a lay, a shuttle, a weft replenishing mechanism including a shuttle feeler arranged to be moved into operative position when the weft replenishing operation is initiated to determine whether the shuttle is properly boxed on the replenishing beat-up of the lay, means for stopping the loom, a stop mechanism connected therewith arranged to be brought into operation to cause loom stoppage when the shuttle feeler encounters an improperly boxed shuttle on the replenishing beat-up of the lay, and connections between the shuttle feeler and the stop mechanism.

11. A loom having, in combination, a lay, a shuttle, a weft replenishing mechanism, a shuttle feeler arranged to be moved into shuttle feeling position only on an actuation of the replenishing mechanism to determine whether the shuttle is properly boxed for the replenishing operation, and a stop mechanism connected with the shuttle feeler and having provision for stopping the loom in the event of an improperly boxed shuttle striking the shuttle feeler.

CLARE H. DRAPER.
JONAS NORTHROP.